United States Patent
Wen et al.

(10) Patent No.: US 11,257,252 B2
(45) Date of Patent: Feb. 22, 2022

(54) IMAGE CODING APPARATUS, PROBABILITY MODEL GENERATING APPARATUS AND IMAGE COMPRESSION SYSTEM

(71) Applicant: FUJITSU LIMITED, Kawasaki (JP)

(72) Inventors: Sihan Wen, Beijing (CN); Jing Zhou, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/874,014

(22) Filed: May 14, 2020

(65) Prior Publication Data

US 2020/0372684 A1 Nov. 26, 2020

(30) Foreign Application Priority Data

May 22, 2019 (CN) .......................... 201910429115.5

(51) Int. Cl.
- *G06K 9/36* (2006.01)
- *G06T 9/00* (2006.01)
- *G06T 3/40* (2006.01)

(52) U.S. Cl.
CPC .............. *G06T 9/00* (2013.01); *G06T 3/4053* (2013.01)

(58) Field of Classification Search
CPC .... G06T 9/20; G06T 7/50; G06T 7/13; G06T 3/602; G06T 9/00; G06T 7/80;
(Continued)

(56) References Cited

U.S. PATENT DOCUMENTS

| 2013/0002816 A1* | 1/2013 | Hannuksela | G06T 9/00 348/43 |
| 2019/0114774 A1* | 4/2019 | Zhang | G06N 3/04 |

(Continued)

FOREIGN PATENT DOCUMENTS

| CN | 1932850 A | 3/2007 |
| CN | 108846355 A | 11/2018 |

(Continued)

OTHER PUBLICATIONS

Fabian Mentzer et al., "Conditional Probability Models for Deep Image Compression", Jan. 12, 2018 IEEE/CVF Conference on Computer Vision and Pattern Recognition, pp. 4394-4402.

(Continued)

*Primary Examiner* — Duy M Dang
(74) *Attorney, Agent, or Firm* — Staas & Halsey, LLP (57) ABSTRACT

Embodiments of this disclosure provide an image coding method and apparatus and an image compression system. The image coding apparatus includes a memory and a processor. The processor is configured to perform feature extraction on an input image to obtain feature maps of N channels; assign a weight to a feature map of each channel among the N channels; perform down-dimension processing on weighted feature maps processed in association with the N channels, to obtain feature maps of M channels and output the feature maps of M channels, M being smaller than N. Hence, by multiplying different feature maps by a weight to obtain corresponding importance and then performing down-dimension processing on the feature maps processed according to the weighting, time for decoding may be reduced.

9 Claims, 7 Drawing Sheets

(58) Field of Classification Search
CPC ..... G06T 7/0002; G06T 3/4053; G06T 9/002; H04N 19/00278; H04N 19/00951; H04N 7/26; H04N 19/00587; H04N 19/0063; H04N 5/23251; H04N 19/136; H04N 19/124; H04N 19/172; H04N 19/1887; H04N 19/13; H04N 19/91; G06K 9/36; G06K 9/6232
See application file for complete search history.

(56) References Cited

U.S. PATENT DOCUMENTS

| | | | |
|---|---|---|---|
| 2019/0205758 A1* | 7/2019 | Zhu | G16H 30/40 |
| 2019/0311202 A1* | 10/2019 | Lee | G06K 9/6256 |
| 2020/0218948 A1* | 7/2020 | Mao | G06T 9/002 |

FOREIGN PATENT DOCUMENTS

| | | |
|---|---|---|
| CN | 108875624 A | 11/2018 |
| EP | 3432263 A1 | 1/2019 |

OTHER PUBLICATIONS

Jooyoung Lee et al., "Context-Adaptive Entropy Model for End-to-end Optimized Image Compression" arXiv:1809.10452v3, Nov. 19, 2018, pp. 1-20.

\* cited by examiner

IMAGE CODING APPARATUS, PROBABILITY MODEL GENERATING APPARATUS AND IMAGE COMPRESSION SYSTEM

CROSS-REFERENCE TO RELATED APPLICATIONS

This application is based on and hereby claims priority to Chinese Application No. 201910429115.5, filed May 22, 2019, in the State Intellectual Property Office of China, the disclosure of which is incorporated herein by reference.

FIELD

This disclosure relates to the technical fields of image compression and deep learning.

BACKGROUND

In recent years, deep learning has dominated the field of computer vision. No matter in image recognition or super-resolution reproduction, deep learning has become an important technique for picture research; however, its capabilities are not limited to these tasks. At present, the deep learning technique has entered the field of image compression, gradually shows great potentials, and becomes a field of hot research.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an aspect of the embodiments of this disclosure, there is provided an image coding apparatus including a memory and a processor coupled to the memory.

The processor is configured to perform feature extraction on an input image to obtain feature maps of N channels; assign a weight to a feature map of each channel among the N channels; and perform down-dimension processing on weighted feature maps processed in association with the N channels, to obtain feature maps of M channels and output the feature maps of M channels, M being smaller than N.

According to an aspect of the embodiments of this disclosure, there is provided a probability model generating apparatus, the apparatus including a hyper decoder configured to perform hyper decoding on code streams received from a hyper encoder to obtain auxiliary information; and a processor. The processor is configured to perform a context model processing to obtain content-based prediction by taking output of an encoder as input; and an entropy model processing to combine output of the context model processing with output of the hyper decoder to obtain a predicted probability model, and provide the predicted probability model to the encoder and a decoder.

According to an embodiment, the context model processing includes obtaining a mean portion of a prediction result according to the output of the encoder, and obtaining a variance portion of the prediction result according to the output of the encoder.

According to an embodiment, the entropy model processing includes combining the mean portion of the prediction result obtained with the auxiliary information outputted by the hyper decoder to obtain a mean portion of the predicted probability model, and combining the variance portion of the prediction result obtained with the auxiliary information outputted by the hyper decoder to obtain a variance portion of the predicted probability model.

According to an aspect of the embodiments of this disclosure, there is provided an image compression system, including: an image coding apparatus configured to perform down sampling on an input image, to convert the input image into a potential representation; a probability model generating apparatus configured to predict probability distribution of the potential representation, to obtain a probability model of the potential representation; and an image decoding apparatus configured to perform up sampling on a potential representation obtained by decoding according to the probability model, to map the potential representation back to the input image.

According to an aspect of the embodiments of this disclosure, there is provided an image coding method, the method including: feature extraction is performed on an input image via a plurality of convolutional layers to obtain feature maps of N channels; a weight is assigned to a feature map of each channel; and down-dimension processing is performed on the feature maps processed by the weighting unit, to obtain feature maps of M channels and output the feature maps of M channels, M being smaller than N.

According to an aspect of the embodiments of this disclosure, there is provided a method for generating a probability model, the method including: decoding on code streams received from an encoder is performed by using a hyper decoder to obtain auxiliary information; output of the encoder is taken as input by using a context model and obtain content-based prediction; and the output of the context model is combined with output of the hyper decoder by using an entropy model, to obtain a predicted probability model to provide to the encoder and the decoder;

According to an embodiment, the entropy model combines a mean portion of the prediction result obtained by the context model with the auxiliary information outputted by the hyper decoder to obtain a mean portion of the probability model, and combines a variance portion of the prediction result obtained by the context model with the auxiliary information outputted by the hyper decoder to obtain a variance portion of the probability model.

According to another aspect of the embodiments of this disclosure, there is provided a computer readable program, which, when executed in an image processing device, will cause the image processing device to carry out the method as described according to embodiments of the present invention.

According to a further aspect of the embodiments of this disclosure, there is provided a computer readable program storage medium, which will cause an image processing device to carry out the method as described according to embodiments of the present invention.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various embodiments of this disclosure shall be described below with reference to the accompanying drawings, and these embodiments are illustrative only, and are not intended to limit this disclosure.

Embodiments of this disclosure provide an image compression method, in which time for decoding may be reduced by reducing a bottleneck of a potential variable, and accurate probability distribution prediction may be achieved by using a separate entropy model to reduce a demand for code streams.

An advantage of the embodiments of this disclosure exists in that according to at least one aspect of embodiments of this disclosure, in image compression, time for decoding is reduced by reducing a bottleneck of a potential variable, that is, by multiplying different feature maps by a weight by a weighting unit to obtain corresponding importance and then performing down-dimension processing by the second feature extracting unit on the feature maps processed by the weighting unit, time for decoding may be reduced. Furthermore, according to at least one aspect of the embodiments of this disclosure, a separate entropy model is used to achieve accurate probability distribution prediction to reduce demands for code streams, that is, two parameters, mu and sigma, of the probability model, are obtained by a separate context processing model unit and a separate entropy model unit. Thus, code streams demanded in coding may be reduced by a more accurate entropy model.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

Embodiment 1

Figure 1:
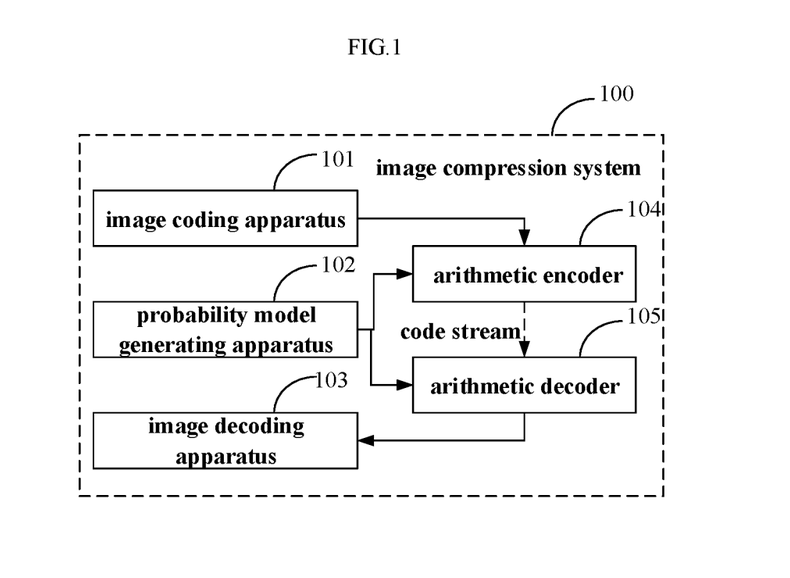
FIG. 1 is a schematic diagram of an image compression system according to an embodiment.

The embodiment of this disclosure provides an image compression system. FIG. 1 is a schematic diagram of the image compression system of the embodiment of this disclosure. As shown in FIG. 1, an image compression system 100 of the embodiment of this disclosure includes: an image coding apparatus 101, a probability model generating apparatus 102 and an image decoding apparatus 103. The image coding apparatus 101 is used to perform downsampling on an input image to transform the input image into a latent representation. The probability model generating apparatus 102 is used to predict probability distribution of the latent representation to obtain a probability model of the latent representation. And the image decoding apparatus 103 is used to perform upsampling on the decoded latent representation according to the probability model to map the latent representation back to the input image.

In the embodiment of this disclosure, as shown in FIG. 1, the image compression system 100 may further include an arithmetic encoder 104 and an arithmetic decoder 105. The arithmetic encoder 104 is used to perform encoding on output from the image coding apparatus 101 according to the probability model generated by the above-described probability model generating apparatus 102. And the arithmetic decoder 105 is used to perform decoding on the received code stream according to the probability model generated by the above-described probability model generating apparatus 102, and provide it to the image decoding apparatus 103.

In the embodiment of this disclosure, the image coding apparatus 101 is used to transform the input image (i.e. pixels of the input image in the embodiment of this disclosure) into a latent representation that is able to reduce a dimensional space (that is, dimension reduction). The image decoding apparatus 103 attempts to map the latent representation back to the above pixels via an approximate inverse function. And the probability model generating apparatus 102 predicts probability distribution of the latent representation by using an entropy model to obtain the probability model of the latent representation.

Figure 2:
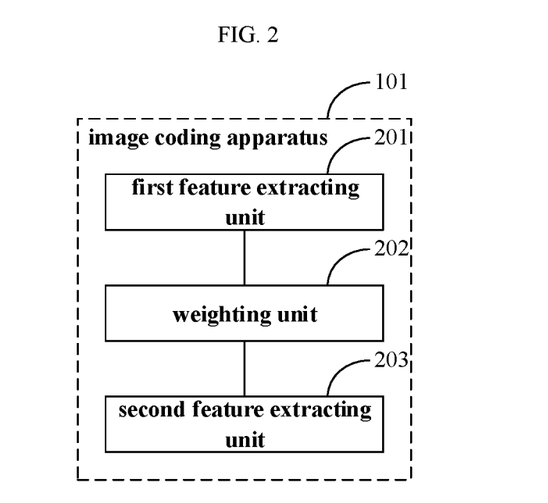
FIG. 2 is a schematic diagram of an image coding apparatus according to an embodiment.

FIG. 2 is a schematic diagram of the image coding apparatus 101 of the embodiment of this disclosure. As shown in FIG. 2, the image coding apparatus 101 of the embodiment of this disclosure includes a first feature extracting unit 201, a weighting unit 202 and a second feature extracting unit 203. The first feature extracting unit 201 performs feature extraction on an input image to obtain feature maps of N channels; the weighting unit 202 assigns a weight to a feature map of each channel; and the second feature extracting unit 203 performs down-dimension processing on the feature maps processed by the weighting unit 202 (i.e. weighted feature maps), to obtain feature maps of M channels and output the feature maps of M channels, M being smaller than N.

Figure 3:
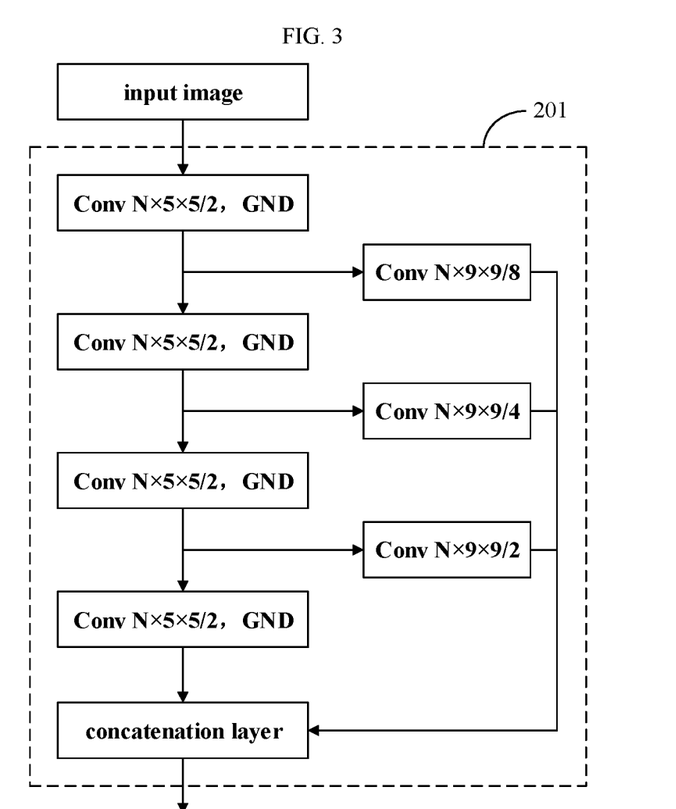
FIG. 3 is a schematic diagram of a network structure of an embodiment of first feature extracting of the image coding apparatus shown in FIG. 2.

In the embodiment of this disclosure, the first feature extracting unit 201 may perform feature extraction on the input image by using a plurality of convolutional layers (which may also be referred to as filters). FIG. 3 is a schematic diagram of a network structure of an embodiment of the first feature extracting unit 201. As shown in FIG. 3 in this example, the feature extraction is performed on the input image via a plurality of convolutional layers and a concatenation layer to obtain the feature maps of the N channels. What is given in FIG. 3 is an example only, and the network structure of the first feature extracting unit 201 is not limited in the embodiment of this disclosure; for example, more or less convolutional layers may be used to perform feature extraction on the input image.

In the embodiment of this disclosure, the weighting unit 202 may assign weights to the channels of the feature maps of the above N channels by using a weighted layer, so as to enhance useful features and suppress less useful features.

In the embodiment of this disclosure, the second feature extracting unit 203 may perform dimension reduction processing on the feature maps of the N channels processed by the weighting unit 202 via one convolutional layer to obtain the feature maps of the M channels. The convolutional layer may be an M×1×1 convolutional layer; where, M is the number of channels, and 1×1 is a kernel of the convolutional layer (also referred to as a convolutional kernel). A purpose of dimension reduction of the feature maps of the above N channels may be achieved via the convolutional layer. Furthermore, regarding principles of operation of the dimension reduction processing, reference may be made to the related art, the description of which being omitted here.

In the embodiment of this disclosure, since the entropy model is very important for image compression, as a part of the input of the entropy model, the context model may effectively improve accuracy of prediction by using information on a pixel preceding a current pixel. However, as the context model is an autoregressive network, the latent representation is coded pixel by pixel. And if the bottleneck of the potential representation becomes larger, time for coding will be greatly increased. In the embodiment of this disclosure, a weighted layer (which may be regarded as a choice of a last layer of the encoder part) is added to assign weights to different channels, so as to effectively enhance useful features and suppress less useful features, and a convolutional layer is used to reduce the number of feature maps from N to M to reduce the time for coding.

Figure 4:
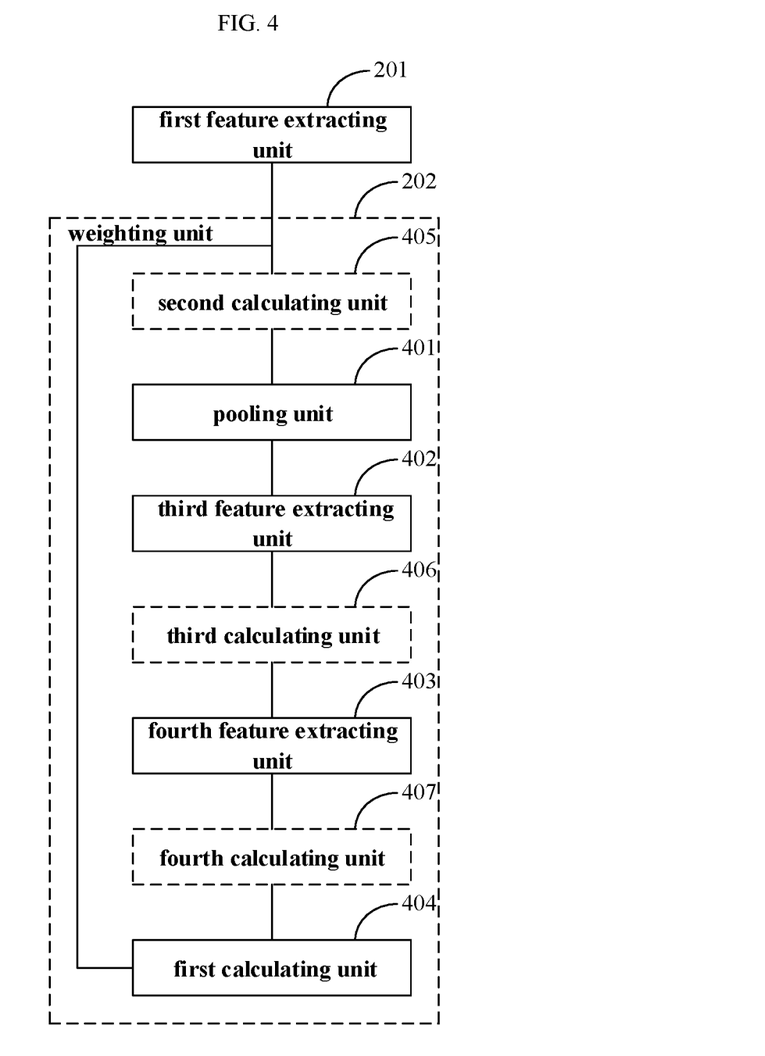
FIG. 4 is a schematic diagram of weighting of the image coding apparatus shown in FIG. 2 according to an embodiment.

FIG. 4 is a schematic diagram of an embodiment of the weighting unit 202 of the embodiment of this disclosure. As shown in FIG. 4, the weighting unit 202 includes a pooling unit 401, a third feature extracting unit 402, a fourth feature extracting unit 403 and a first calculating unit 404.

The pooling unit 401 is configured to calculate an average value of a feature map of each of the input N channels to obtain a statistical characteristic of the feature map of each channel. The pooling unit 401 may adopt a global mean pooling layer to perform pooling processing on the input feature maps. Regarding principles of operation of the global mean pooling layer, reference may be made to the related art, the description of which being omitted here.

The third feature extracting unit 402 is configured to perform down-dimension processing on the feature maps processed by the pooling unit 401, to obtain feature maps of the M channels. The third feature extracting unit 402 may be implemented by a convolutional layer, which may be an M×1×1 convolutional layer; where, M is the number of channels, and 1×1 is a convolutional kernel (kernel) of the convolutional layer. Regarding principles of operation of the convolutional layer, reference may be made to the related art, the description of which being omitted here.

The fourth feature extracting unit 403 is configured to perform up-dimension processing on the feature maps of the M channels to obtain the feature maps of the N channels. The fourth feature extracting unit 403 may also be implemented by a convolutional layer, which may be an N×1×1 convolutional layer; where, N is the number of channels, and 1×1 is a convolutional kernel (kernel) of the convolutional layer. Regarding principles of operation of the convolutional layer, reference may be made to the related art, the description of which being omitted here.

And the first calculating unit 404 is configured to multiply the feature maps of the N channels extracted by the fourth feature extracting unit 403 by the feature maps of the input N channels (i.e. the feature maps of the N channels from the encoder) to obtain feature maps of the N channels after being weight processed, and output the feature maps of the N channels after being weight processed to the second feature extracting unit 203. The first calculating unit 404 may be implemented by a scale function, and regarding principles of operation of the scale function, reference may be made to the related art, the description of which being omitted here.

The weighting unit 202 of the embodiment of this disclosure is addressed to providing weights for the last layer of the encoder part to selectively enhance useful features and suppress less useful features. It first generates the statistical characteristics of the channels by using a global mean pooling layer, and then better learns a nonlinear interaction between the channels by reducing and increasing the number of channels by using two convolutional layers. And furthermore, as the number of the feature maps needs to be reduced from N to M, the two convolutional layers are used in the embodiment of this disclosure to change the number of channels from M to N to obtain more corresponding weights.

In the embodiment of this disclosure, as shown in FIG. 4, the weighting unit 202 may further include a second calculating unit 405, a third calculating unit 406 and a fourth calculating unit 407. The second calculating unit 405 is located before the pooling unit 401, and is configured to take an absolute value on the feature maps of the input N channels (i.e. the feature maps of the N channels from the encoder) and output the absolute value to the pooling unit 401. The second calculating unit 405 may be implemented by an abs function, and its principles of operation shall not be described herein any further. The third calculating unit 406 is located between the third feature extracting unit 402 and the fourth feature extracting unit 403, and is configured to perform activation operation on the feature maps of the M channels from the third feature extracting unit 402. The third calculating unit 406 may be implemented by a relu function, and its principles of operation shall not be described herein any further. And the fourth calculating unit 407 is located between the fourth feature extracting unit 403 and the first calculating unit 404, and is configured to limit the feature maps of the N channels from the fourth feature extracting unit 403 within a range of 0~1. The fourth calculating unit 407 may be implemented by a sigmoid function, and its principles of operation shall not be described herein any further.

Figure 5:
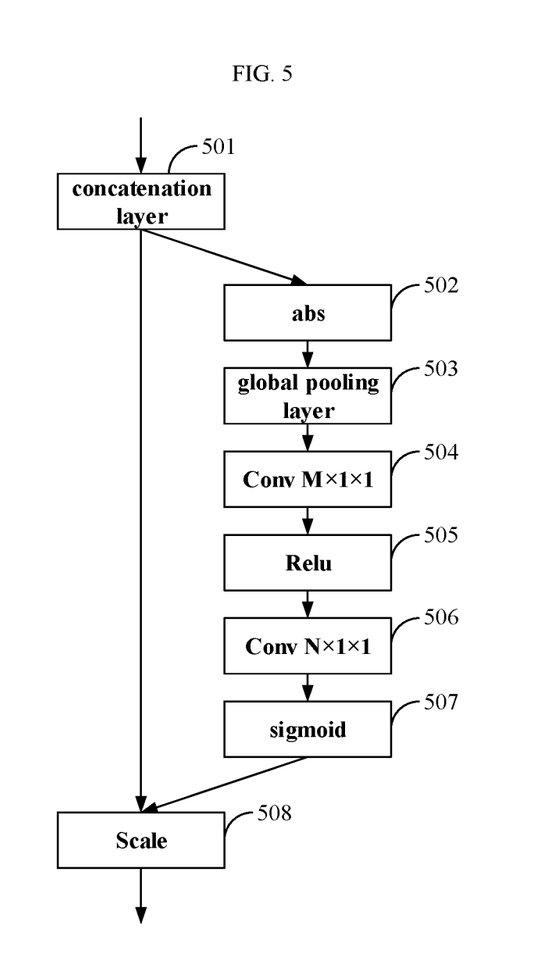
FIG. 5 is a schematic diagram of a network structure to which the weighting shown in FIG. 4 corresponds according to an embodiment.

FIG. 5 is a schematic diagram of a network structure of an embodiment of the weighting unit 202 of the embodiment of this disclosure. As shown in FIG. 5, a concatenation layer 501 corresponds to the last layer of the encoder. As shown in FIG. 3, its output is the feature maps of the N channels; an abs 502 corresponds to the second calculating unit 405 of FIG. 4, which performs absolute value taking processing on the feature maps of the N channels; a global pooling layer 503 corresponds to the pooling unit 401 of FIG. 4, and performs pooling processing on the feature maps of the N channels outputted by the abs; a convolutional layer 504 corresponds to the third feature extracting unit 402 of FIG. 4, and performs down-dimension processing on the feature maps of the N channels outputted by the global pooling layer to obtain the feature maps of the M channels; a Relu 505 corresponds to the third calculating unit 406 of FIG. 4, and performs activation operation on the feature maps of the M channels; a convolutional layer 506 corresponds to the fourth feature extracting unit 403 of FIG. 4, and performs up-dimension processing on the feature maps of the M channels outputted by the Relu to obtain the feature maps of the N channels; and a sigmoid 507 corresponds to the fourth calculating unit 407 of FIG. 4, and limits the feature maps of the N channels within the range of 0~1; and a Scale 508 corresponds to the first calculating unit 404 of FIG. 4, and multiplies the feature maps of the N channels outputted by the concatenation layer by the feature maps of the N channels outputted by the sigmoid to obtain feature maps of the N channels, and outputs the feature maps of the N channels.

The network structure of the weighted layer shown in FIG. 5 is for illustration only. In the embodiment of this disclosure, the weighted layer may also have other network structures, such as adding some convolutional layers, or removing the above global pooling layer, as long as the feature maps of the input N channels may be assigned weights.

By adding the above weighted layer into the image coding apparatus and assigning weights for different channels, it is possible to enhance useful features and suppress less useful features.

Figure 6:
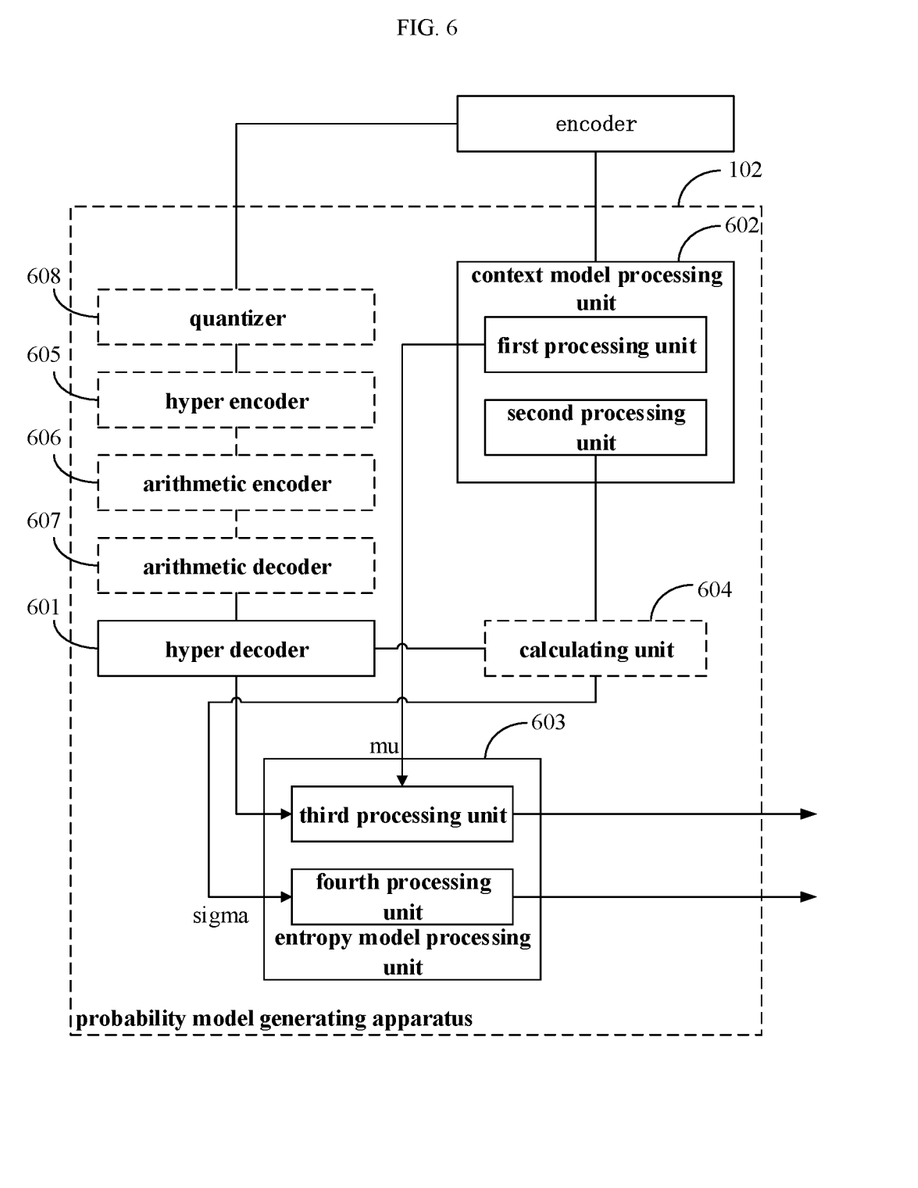
FIG. 6 is a schematic diagram of a probability model generating apparatus according to an embodiment.

FIG. 6 is a schematic diagram of a probability model generating apparatus 102 of the embodiment of this disclosure. As shown in FIG. 6, the probability model generating apparatus 102 of the embodiment of this disclosure includes a hyper decoder 601, a context model processing unit 602 and an entropy model processing unit 603. The hyper decoder 601 is configured to perform hyper decoding on code streams received from a hyper encoder to obtain auxiliary information; the context model processing unit 602 is configured to take output of an encoder as input and obtain content-based prediction; and the entropy model processing unit 603 is configured to combine the output of the context model processing unit 602 with output of the hyper decoder 601, and obtain predicted probability model to provide to the encoder and the decoder.

In the embodiment of this disclosure, as shown in FIG. 6, the context model processing unit 602 includes a first processing unit and a second processing unit, the first processing unit obtaining a mean portion of a prediction result according to the output of the encoder, and the second processing unit obtaining a variance portion of the prediction result according to the output of the encoder. And the entropy model processing unit 603 includes a third processing unit and a fourth processing unit, the third processing unit combining the mean portion of the prediction result obtained by the first processing unit with the auxiliary information outputted by the hyper decoder 601 to obtain a mean portion of the probability model, and the fourth processing unit combining the variance portion of the prediction result obtained by the second processing unit with the auxiliary information outputted by the hyper decoder 601 to obtain a variance portion of the probability model.

In the embodiment of this disclosure, the entropy model processing unit 603 is configured to predict a probability model of a latent representation, which combines the context model (a potential autoregressive model) with a hyper-network (a hyper encoder and a hyper decoder) to correct context-based prediction information via useful information learned from the hyper-network, to generate a mean value and scale parameters (variance) of a conditional Gaussian entropy model (the above probability model). Unlike the related art, the embodiment of this disclosure combines the mean value part of the context model with the output of the hyper decoder to obtain the mean value part of the entropy model, and combines a variance part of the context model with the output of the hyper decoder to obtain a variance part of the entropy model. As the mean value part and variance part of the entropy model are respectively obtained, potential distribution may be analyzed more accurately.

In the embodiment of this disclosure, as shown in FIG. 6, the probability model generating apparatus 102 may further include a calculating unit 604 configured to take an absolute value of the variance portion of the prediction result obtained by the second processing unit and provide the absolute value to the fourth processing unit, and take an absolute value of the output of the hyper decoder 601 and provide the absolute value to the fourth processing unit. The calculating unit 604 may be implemented by an absolute value function abs. As a value of sigma is mainly representative of variance of data, a layer having an absolute value function is added before the entropy model of sigma is generated, which may provide sigma with a better representation.

In the embodiment of this disclosure, as shown in FIG. 6, the probability model generating apparatus 102 may further include a quantizer 608, a hyper encoder 605, an arithmetic encoder 606 and an arithmetic decoder 607. The quantizer 608 is configured to perform quantization processing on the output of the encoder, hence, a latent representation from the encoder is quantized and a discrete value vector is generated; the hyper encoder 605 is configured to further code on output of the quantizer 608; the arithmetic encoder 606 is configured to perform arithmetic coding on output of the hyper encoder 605 to obtain a code stream and output the code stream; and the arithmetic decoder 607 is configured to decode a received code stream and output the decoded code stream to the hyper decoder 601. Regarding principles of operations of the quantizer 608, the hyper encoder 605, the arithmetic encoder 606 and the arithmetic decoder 607, reference may be made to the related art, the description of which being omitted here.

Figure 7:
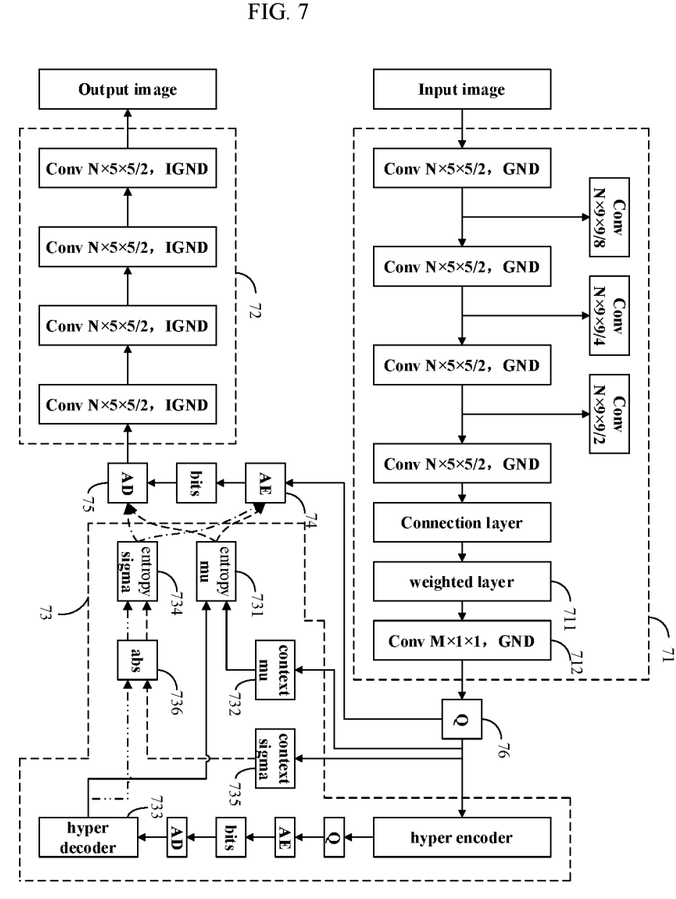
FIG. 7 is a schematic diagram of a network structure of an embodiment of the image compression system.

FIG. 7 is a schematic diagram of a network structure of an embodiment of the image compression system of the embodiment of this disclosure. As shown in FIG. 7, the image compression system includes an image coding apparatus 71, an image decoding apparatus 72 and a probability model generating apparatus 73. The image coding apparatus 71 corresponds to the image coding apparatus 101 of FIG. 2, which adds a weighted layer 711 to enhance useful features and suppress less useful features, and reduces the number of feature maps (number of channels) from N to M by using a convolutional layer 712 so as to reduce the number of pixels; the probability model generating apparatus 73 corresponds to the probability model generating apparatus 102 of FIG. 6, wherein an mu portion 731 of the entropy model combines an mu portion 732 of the context model with the output of a hyper decoder 733 to generate an mu portion of the probability model, and a sigma portion 734 of the entropy model combines a sigma portion 735 of the context model with the output of the hyper decoder 733 to generate a sigma portion of the probability model. And furthermore, an abs 736 is added before the sigma portion 734 of the entropy model to take an absolute value on the sigma portion of the context model and the output of the hyper decoder, so as to better represent the sigma portion of the entropy model.

In the embodiment of this disclosure, as shown in FIG. 7, the image compression system may further include an arithmetic encoder (AE) 74 and an arithmetic decoder (AD) 75. The arithmetic encoder 74 is configured to further encode the output of the image coding apparatus 71 according to the probability model generated by the probability model generating apparatus 73. And the arithmetic decoder 75 is configured to decode a received code stream according to the probability model generated by the probability model generating apparatus 73 and provide the decoded code stream to the image decoding apparatus 72. Furthermore, as shown in FIG. 7, the image compression system may further include a quantizer 76, which performs quantization processing on the output from the image coding device 71, thereby the latent representation from the image coding apparatus 71 is quantized, and discrete vectors are generated, which are provided to the arithmetic encoder 74 and the context models 732 and 735.

In the embodiment of this disclosure, the image decoding apparatus 72 performs inverse mapping on an input feature map by using four convolutional layers to obtain an output image; however, the embodiment of this disclosure is not limited thereto. For example, the image decoding apparatus 72 may perform inverse mapping on the input feature map by using more or less convolutional layers. For details, reference may be made to the related art, which shall not be described herein any further.

The image compression system of the embodiment of this disclosure adopts the image coding apparatus of the embodiment of this disclosure to obtain the corresponding importance by multiplying different feature maps by a weight by the weighting unit, and then performs down-dimension by the second feature extracting unit on the feature maps processed by the weighting unit, which may reduce the time for decoding, thereby achieving reduction of time for decoding by reducing the bottleneck of the latent variable. And furthermore, the image compression system of the embodiment of this disclosure adopts the probability model generating apparatus of the embodiment of this disclosure to obtain the two parameters, mu and sigma, of the probability model, by the separate context processing model unit and entropy model unit. Hence, demands for code streams in coding may be reduced by a more accurate entropy model, thereby achieving reduction of demands for code streams by using a separate entropy model to achieve accurate probability distribution prediction.

Embodiment 2

The embodiment of this disclosure provides an image coding apparatus. FIG. 2 is a schematic diagram of the image coding apparatus of the embodiment of this disclosure, FIG. 3 is a schematic diagram of a network structure of an embodiment of a first feature extracting unit 201 of the image coding apparatus of the embodiment of this disclosure, FIG. 4 is a schematic diagram of a network structure of an embodiment of a weighting unit 202 of the image coding apparatus of the embodiment of this disclosure, FIG. 5 is a schematic diagram of a network structure of an embodiment of the weighting unit 202 shown in FIG. 4, and the image compression system in FIG. 7 shows the image coding apparatus of the embodiment of this disclosure. As the image coding apparatus has been described in detail in Embodiment 1, the contents of which are incorporated herein, which shall not be described herein any further.

With the image coding apparatus of the embodiment of this disclosure, time for decoding is reduced by reducing a bottleneck of a potential variable.

Embodiment 3

The embodiment of this disclosure provides a probability model generating apparatus. FIG. 6 is a schematic diagram of the probability model generating apparatus of the embodiment of this disclosure, FIG. 7 shows the probability model generating apparatus of the embodiment of this disclosure. As the probability model generating apparatus has been described in detail in Embodiment 1, the contents of which are incorporated herein, which shall not be described herein any further.

With the probability model generating apparatus of the embodiment of this disclosure, a separate entropy model is used to achieve accurate probability distribution prediction, so as to reduce demands for code streams.

Embodiment 4

The embodiment of this disclosure provides an image coding method. As principles of the method for solving problems are similar to that of the apparatus in Embodiment 2, which is described in Embodiment 1, reference may be made to the implementations of the apparatus in Embodiments 1 and 2 for implementation of the method, with identical contents being not going to be described herein any further.

Figure 8:
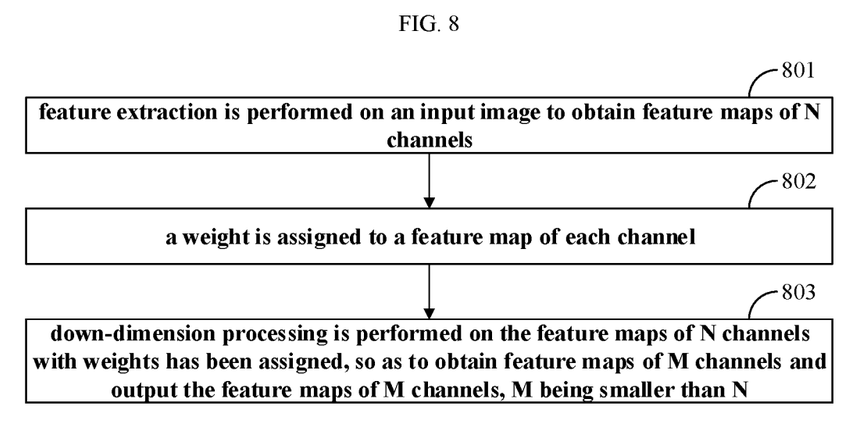
FIG. 8 is a schematic diagram of an image coding method according to an embodiment.

FIG. 8 is a schematic diagram of the image coding method of the embodiment of this disclosure. As shown in FIG. 8, the image coding method includes:

801: feature extraction is performed on an input image via a plurality of convolutional layers to obtain feature maps of N channels;

802: a weight is assigned to a feature map of each channel; and

803: down-dimension processing is performed on the feature maps of N channels with weights has been assigned, to obtain feature maps of M channels and output the feature maps of M channels, M being smaller than N.

In the embodiment of this disclosure, reference may be made to the implementations of the units in FIG. 2 for implementations of the operations in FIG. 8, which shall not be described herein any further.

In operation 802, following processing may be performed:

calculating an average value of a feature map of each of the N channels from encoder to obtain a statistical characteristic of the feature map of each channel;

performing down-dimension processing on the feature maps of the N channels by using an M×1×1 convolutional layer, to obtain feature maps of the M channels;

performing up-dimension processing on the feature maps of the M channels by using an N×1×1 convolutional layer to obtain the feature maps of the N channels; and multiplying the feature maps of the N channels from the encoder by the feature maps of the input N channels from the N×1×1 convolutional layer to obtain feature maps of the N channels after being weight processed, and outputting the feature maps of the N channels after being weight processed.

In the embodiment of this disclosure, implementation of operation 802 may refer to the implementation of FIG. 4 and FIG. 5 in Embodiment 1, which shall not be described herein any further.

In the embodiment of this disclosure, before using a global average pooling layer to average the feature map of each of the N channels from the encoder, an abs function may be used to take the absolute value of the feature maps of the N channels from the encoder, and principles of operation of the abs function shall not be described herein any further.

In the embodiment of this disclosure, before using the N×1×1 convolutional layer to perform up-dimension processing on the feature maps of the M channels, a relu function may be used to perform activation operation on the feature maps of the M channels, and principles of operation of the relu function shall not be described herein any further.

In the embodiment of this disclosure, before multiplying the feature maps of the N channels from the encoder by the feature maps of the N channels from the N×1×1 convolutional layer, a sigmoid function may be used to limit the feature maps of the N channels within a range of 0~1, and principles of operation of the sigmoid function shall not be described herein any further.

With the image coding method of the embodiment of this disclosure, time for decoding is reduced by reducing a bottleneck of a potential variable.

Embodiment 5

The embodiment of this disclosure provides a method for generating a probability model. As principles of the method for solving problems are similar to that of the apparatus in Embodiment 3, which is described in Embodiment 1, reference may be made to the implementations of the apparatus in Embodiments 1 and 3 for implementation of the method, with identical contents being not going to be described herein any further.

Figure 9:
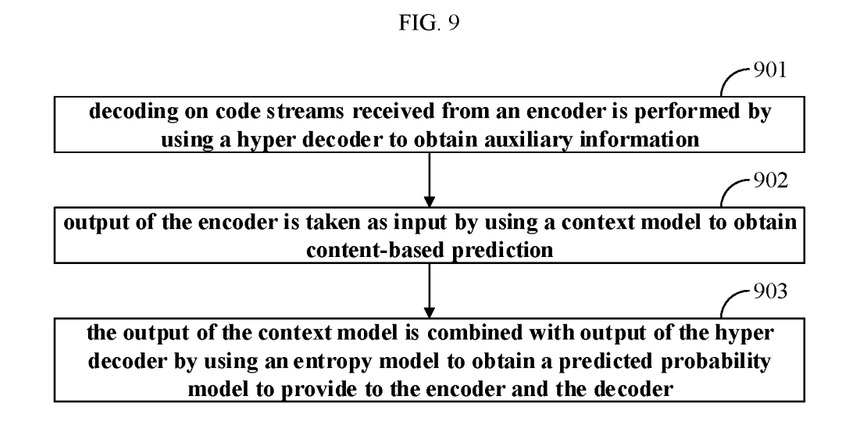
FIG. 9 is a schematic diagram of a method for generating a probability model according to an embodiment.

FIG. 9 is a schematic diagram of the method for generating a probability model of the embodiment of this disclosure. As shown in FIG. 9, the method for generating a probability model includes:

901: decoding on code streams received from an encoder is performed by using a hyper decoder to obtain auxiliary information;

902: output of the encoder is taken as input by using a context model to obtain content-based prediction; and 903: the output of the context model is combined with output of the hyper decoder by using an entropy model to obtain a predicted probability model to provide to the encoder and the decoder.

In the embodiment of this disclosure, the entropy model combines an mu portion of the context model with the output of the hyper decoder to obtain an mu portion of the probability model, and combines a sigma portion of the context model with the output of the hyper decoder to obtain a sigma portion of the probability model.

In the embodiment of this disclosure, before operation 901, a hyper encoder may be used to further encode the output of the encoder, and an arithmetic encoder may be used to perform arithmetic encoding on the output of the hyper encoder to obtain code stream to output, and an arithmetic decoder is used to perform decoding on received code stream and provide it to the above hyper decoder.

In the embodiment of the present application, in operation 903, an absolute value function abs may be used to perform absolute value taking processing on the sigma portion of the context model and the output of the hyper decoder, and then provide the absolute value to the entropy model, that is, the entropy model may obtain the sigma portion of the probability model by combining the absolute value of the sigma portion of the context model and the absolute value of the output of the hyper decoder.

With the method for generating a probability model of the embodiment of this disclosure, a separate entropy model is used to achieve accurate probability distribution prediction, so as to reduce demands for code streams.

Embodiment 6

The embodiment of this disclosure provides an image processing device, including the image coding apparatus described in Embodiments 1 and 2, or including the probability model generating apparatus described in Embodiments 1 and 3, or including the image coding apparatus described in Embodiments 1 and 2 and the probability model generating apparatus described in Embodiments 1 and 3, or including the probability model generating apparatus described in Embodiments 1 and 3 and the image decoding apparatus described in Embodiment 1.

As the image coding apparatus, the probability model generating apparatus and the image decoding apparatus have been described in detail in Embodiments 1-3, the contents of which are incorporated herein, which shall not be described herein any further.

Figure 10:
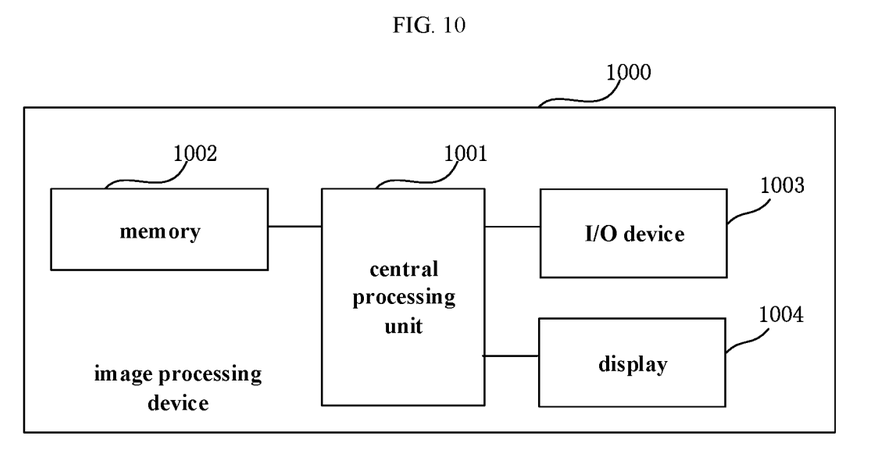
FIG. 10 is a schematic diagram of an image processing device according to an embodiment.

FIG. 10 is a schematic diagram of the image processing device of the embodiment of this disclosure. As shown in FIG. 10, an image processing device 1000 may include a central processing unit (CPU) 1001 and a memory 1002, the memory 1002 being coupled to the central processing unit 1001. The memory 1002 may store various data, and furthermore, it may store a program for information processing, and execute the program under control of the central processing unit 1001.

In one embodiment, functions of the image coding apparatus and/or the probability model generating apparatus and/or the image decoding apparatus may be integrated into the central processing unit 1001. The central processing unit 1001 may be configured to carry out the method(s) as described in Embodiment(s) 4 and/or 5.

In another embodiment, the image coding apparatus and/or the apparatus for generating a probability model and/or the image decoding apparatus and the central processing unit 1001 may be configured separately; for example, the image coding apparatus and/or the probability model generating apparatus and/or the image decoding apparatus may be configured as a chip connected to the central processing unit 1001, and the functions of the image coding apparatus and/or the probability model generating apparatus and/or the image decoding apparatus are executed under the control of the central processing unit 1001.

Furthermore, as shown in FIG. 10, the image processing device may include an input/output (I/O) device 1003, and a display 1004, etc.; wherein functions of the above components are similar to those in the related art, and shall not be described herein any further. It should be noted that the image processing device does not necessarily include all the components shown in FIG. 10; and furthermore, the image processing device may also include components not shown in FIG. 10, and reference may be made to the related art.

An embodiment of this disclosure provides a computer readable program, which, when executed in an image processing device, will cause the image processing device to carry out the method(s) as described in Embodiment(s) 4 and/or 5.

An embodiment of this disclosure provides a computer readable program storage medium, which will cause an image processing device to carry out the method(s) as described in Embodiment(s) 4 and/or 5.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The processing methods carried out in the apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 2 and 6 may either correspond to software modules of procedures of a computer program, or correspond to hardware modules. Such software modules may respectively correspond to the steps shown in FIGS. 8 and 9. And the hardware module, for example, may be carried out by firming the software modules by using a field programmable gate array (FPGA).

The software modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The software modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the software modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An image coding apparatus, comprising:
    a memory; and
    a processor coupled to the memory and configured to:
        perform feature extraction on an input image to obtain feature maps of N channels;
        assign a weight to a feature map of each channel among the N channels; and
        perform down-dimension processing on weighted feature maps processed in association with the N channels, to obtain feature maps of M channels and output the feature maps of M channels, M being smaller than N,
    wherein, in processing of assigning the weight to the feature, the processor is configured to:
        calculate an average value of a weighted feature map of each of the N channels to obtain a statistical characteristic of the feature map of each channel;
        perform the down-dimension processing on feature maps processed by the calculation, to obtain the feature maps of the M channels;
        perform up-dimension processing on the feature maps of the M channels to obtain the feature maps of the N channels; and
        multiply the feature maps of the N channels extracted by the up-dimension processing by the feature maps of the N channels to obtain feature maps of the N channels after being weight processed, and output the feature maps of the N channels after being weight processed for the down-dimension processing.

2. The image coding apparatus according to claim 1, wherein the processor is configured to:
    take an absolute value, prior to calculating the average value, of the feature maps of the N channels and output the absolute value for the calculating;

perform activation operation on the feature maps of the M channels between performing the down-dimension processing and the up-dimension processing; and limit the feature maps of the N channels within a range of 0~1 subsequent to the performing of the up-dimension processing and prior to the multiplying of the N channels extracted by the feature maps of the input N channels.

3. A probability model generating apparatus, comprising:
a hyper decoder configured to perform hyper decoding on code streams received from a hyper encoder to obtain auxiliary information;
a processor configured to:
    perform a context model processing to obtain content-based prediction by taking output of an encoder as input; and
    perform an entropy model processing to combine output of the context model processing with output of the hyper decoder to obtain a predicted probability model, and provide the predicted probability model to the encoder and a decoder;
wherein, the context model processing includes:
    obtaining a mean portion of a prediction result according to the output of the encoder, and obtaining a variance portion of the prediction result according to the output of the encoder; and
    the entropy model processing includes combining the mean portion of the prediction result obtained with the auxiliary information outputted by the hyper decoder to obtain a mean portion of the predicted probability model, and combining the variance portion of the prediction result obtained with the auxiliary information outputted by the hyper decoder to obtain a variance portion of the predicted probability model.

4. The probability model generating apparatus according to claim 3, further comprising:
a hyper encoder configured to code the output of the encoder;
a quantizer configured to perform quantization processing on output of the hyper encoder to generate a discrete value vector;
an arithmetic encoder configured to perform arithmetic coding on output of the quantizer to generate a code stream and output the code stream; and
an arithmetic decoder configured to decode a received code stream and output the decoded code stream to the hyper decoder.

5. The probability model generating apparatus according to claim 4, wherein the processor is configured to:
take an absolute value of the variance portion of the prediction result obtained and provide the absolute value for the combining of the variance portion, and
take an absolute value of the output of the hyper decoder and provide the absolute value to for the combining of the variance portion.

6. The probability model generating apparatus according to claim 3, wherein the processor is configured to:
take an absolute value of the variance portion of the prediction result obtained and provide the absolute value for the combining of the variance portion, and
take an absolute value of the output of the hyper decoder and provide the absolute value to for the combining of the variance portion.

7. An image compression system, comprising:
an image coding apparatus configured to perform down sampling on an input image, to convert the input image into a potential representation;
a probability model generating apparatus configured to predict probability distribution of the potential representation, to obtain a probability model of the potential representation; and
an image decoding apparatus configured to perform up sampling on a potential representation obtained by decoding according to the probability model, to map the potential representation back to the input image,
wherein the image coding apparatus is configured to:
    perform feature extraction on the input image to obtain feature maps of N channels;
    assign a weight to a feature map of each channel among the N channels; and
    perform down-dimension processing on weighted feature maps processed in association with the N channels, to obtain feature maps of M channels and output the feature maps of M channels, M being smaller than N,
wherein, in processing of assigning the weight to the feature, the image coding apparatus is configured to:
    calculate an average value of a weighted feature map of each of the N channels to obtain a statistical characteristic of the feature map of each channel;
    perform the down-dimension processing on feature maps processed by the calculation, to obtain the feature maps of the M channels;
    perform up-dimension processing on the feature maps of the M channels to obtain the feature maps of the N channels; and
    multiply the feature maps of the N channels extracted by the up-dimension processing by the feature maps of the N channels to obtain feature maps of the N channels after being weight processed, and output the feature maps of the N channels after being weight processed for the down-dimension processing.

8. The image compression system according to claim 7, further comprising:
a quantizer configured to perform quantization processing on output of the image coding apparatus to generate a discrete value vector;
an arithmetic encoder configured to perform coding on output of the quantizer according to the probability model generated by the probability model generating apparatus to generate code stream and output the code stream; and
an arithmetic decoder configured to decode a received code stream according to the probability model generated by the probability model generating apparatus and provide the decoded code stream to the image decoding apparatus.

9. The image compression system according to claim 7, wherein the probability model generating apparatus comprises:
a hyper decoder configured to perform hyper decoding on code streams received from a hyper encoder to obtain auxiliary information;
a processor configured to:
    perform a context model processing to obtain content-based prediction by taking output of an encoder as input; and
    perform an entropy model processing to combine output of the context model processing with output of the hyper decoder to obtain a predicted probability model, and provide the predicted probability model to the encoder and a decoder;

wherein, the context model processing includes:
obtaining a mean portion of a prediction result according to the output of the encoder, and obtaining a variance portion of the prediction result according to the output of the encoder; and the entropy model processing includes:
combining the mean portion of the prediction result obtained with the auxiliary information outputted by the hyper decoder to obtain a mean portion of the predicted probability model, and combining the variance portion of the prediction result obtained with the auxiliary information outputted by the hyper decoder to obtain a variance portion of the predicted probability model.

* * * * *